United States Patent [19]

Matsunaga et al.

[11] Patent Number: 4,940,105

[45] Date of Patent: Jul. 10, 1990

[54] STEERING GEAR FOR A VEHICLE

[75] Inventors: Tsugiharu Matsunaga, Aichi; Yasutaka Hayashi, Seto; Katsuhiko Hattori, Nagoya, all of Japan

[73] Assignee: Kabushiki Kaisha Toyota Chuo Kenkyusho, Tokyo, Japan

[21] Appl. No.: 170,726

[22] Filed: Mar. 21, 1988

[30] Foreign Application Priority Data

Mar. 20, 1987 [JP] Japan .................................. 62-67179

[51] Int. Cl.$^5$ ............................................. B62D 5/00
[52] U.S. Cl. ................................. 180/133; 74/388 PS; 180/142
[58] Field of Search ................ 180/132, 133, 142, 79, 180/0; 74/388 PS, 388 R; 91/368

[56] References Cited

U.S. PATENT DOCUMENTS

| | | | |
|---|---|---|---|
| 4,715,464 | 12/1987 | Nakamura et al. | 180/142 |
| 4,730,687 | 3/1988 | Chikuma et al. | 180/143 |
| 4,741,408 | 5/1988 | Bausch et al. | 180/79.1 |

Primary Examiner—David M. Mitchell
Assistant Examiner—Richard Camby
Attorney, Agent, or Firm—Ladas & Parry

[57] ABSTRACT

In a steering gear having a steering correction function for causing a vehicle to correct steering when disturbance acts on a power steering gear or the vehicle, there are provided a connecting portion for connecting the input shaft to output shaft and for detecting the abnormal state; and a releasable portion for a drive unit operation of the steering drive unit interlocked with a connecting operation of the connecting mechanism. In a normally "OFF" (disengagement) state of the clutch, a steering drive control device controls a steering drive unit in accordance with a steering command from a steering control device, and a steering driving force is transmitted from the steering drive unit to the steering device through a transmissional mechanism for the steering driving force, thereby performing steering. However, in an abnormal state, the clutch mechanically detects the abnormal state and is engaged from the "OFF" state to an "ON" (engagement) state to connect the input device and the steering device. During this connection, a force acting from the steering drive unit to the steering device is released by a releasable mechanism for a drive unit operation, thereby performing manual steering.

15 Claims, 9 Drawing Sheets

STEERING GEAR FOR A VEHICLE

BACKGROUND OF THE INVENTION

I. Field of the Invention

The present invention relates to a steering gear for a vehicle and, more particularly, to a power steering gear or a steering gear having a steering correction function for causing a vehicle to perform a steering correction when disturbance acts on the vehicle, wherein a fail-safe mechanism is provided to allow manual steering when a power assist device or a control device fails.

II. Description of the Prior Art

Figure 2:
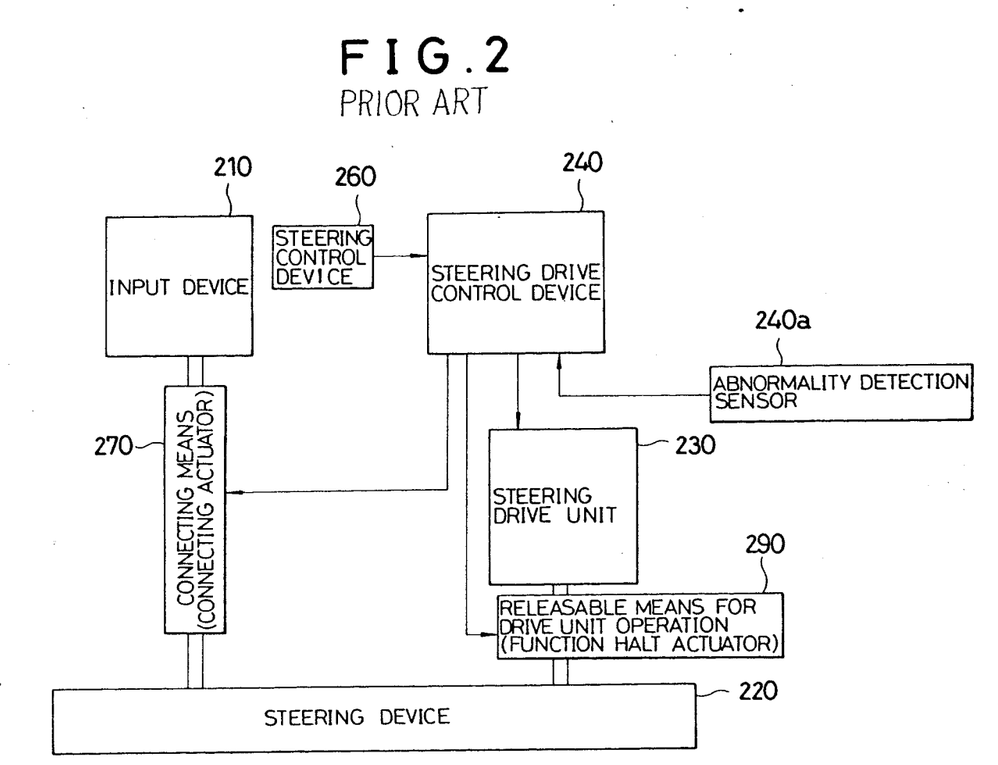
FIG. 2 is a block diagram thereof and FIG. 3 is a schematic view thereof.
Figure 3:
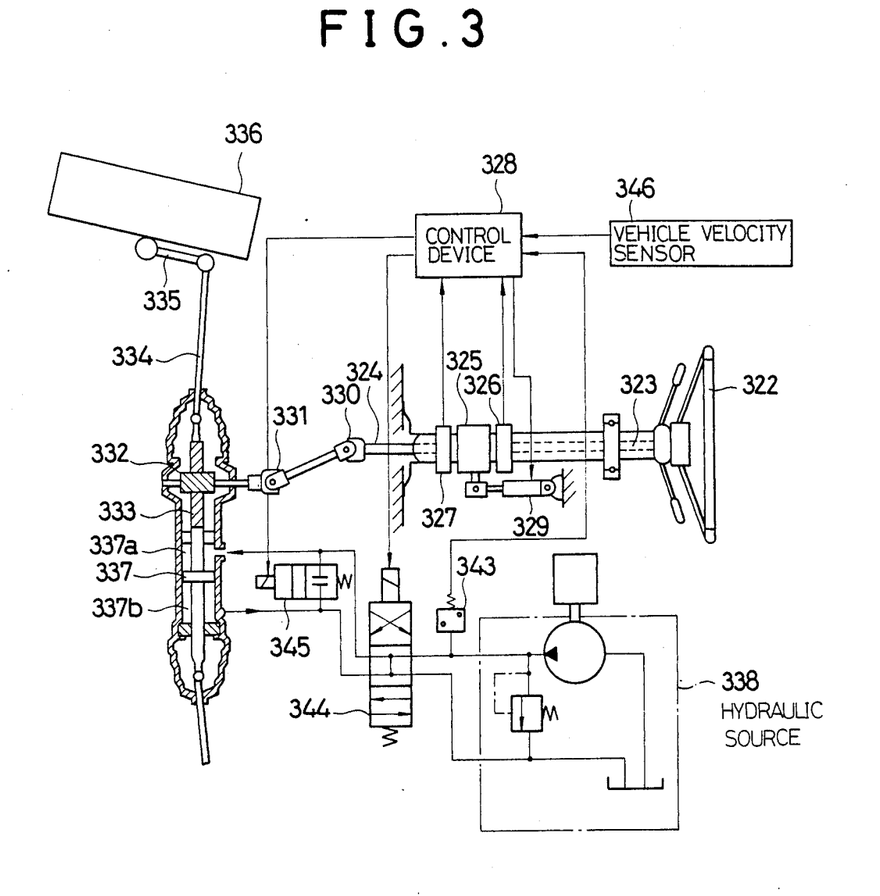

A typical conventional fail-safe mechanism used in a steering gear for a vehicle is shown in FIG. 2. A failure in a steering drive unit 230 or a steering drive control device 240 is electrically detected by an abnormality detection sensor 240a. An electrical signal is output from the steering drive control device 240 to actuate a connecting actuator 270 and a function halt actuator 290 to engage an input device 210 with a steering device 220, and to halt the function of the steering drive device 240. Reference numeral 260 denotes a steering control device. A typical example of such a steering gear for a vehicle is shown in FIG. 3 (Japanese Laid-Open Utility Model Publication No. 61-35082).

The arrangement and the principle of operation of the above steering gear for a vehicle will be briefly described. An input shaft 323 is connected to a steering wheel 322. A steering angle detection sensor 326 is connected to the input shaft 323 to detect a steering angle. The input shaft 323 is connected to an output shaft 324 through a clutch means 325. An actual steering angle detection sensor 327 is arranged on the output shaft 324. The output shaft 324 is connected to a pinion 332 through joints 330 and 331. The clutch means 325 is operated by an actuator 329. The pinion 332 is meshed with a rack 333. A power cylinder 337 is connected integrally with the rack 333. The rack 333 is connected to a wheel 336 through a linkage 334 and a knuckle arm 335. Oil from a hydraulic source 338 is selectively supplied to oil chambers 337a and 337b by an electromagnetic spool valve 344. A pressure-sensitive switch 343 is arranged in a line between the hydraulic source 338 and the electromagnetic spool type valve 344. A clutch valve 345 is arranged in lines between the electromagnetic spool type valve 344 and the oil chambers 337a and 337b in the power cylinder 337 to connect the two lines. Signals from a vehicle velocity sensor 346, the steering angle sensor 326, the steered angle sensor 327, and the pressure-sensitive switch 343 are input to a control device 328. Control signals are output from the control device 328 to the electromagnetic spool type valve 344, the actuator 329 in the clutch means 325 and the clutch valve 345.

In the normal operation, the clutch means 325 and the clutch valve 345 are kept in the OFF state. The electromagnetic spool type valve 344 is controlled in accordance with signals from the steering angle detection sensor 326 and the steered angle detection sensor 327, and steering is performed in accordance with a rotational angle of the steering wheel 322. However, when the control device 328 receives through an OR gate a hydraulic failure signal from the pressure-sensitive switch 343, a controller abnormality signal, or a vehicle velocity signal representing that a vehicle velocity is higher than predetermined vehicle velocity, a control signal is output from the control device 328 to actuate the clutch means 325 and the clutch valve 345. Then, the input shaft 323 is connected to the output shaft 324, and at the same time, the oil chambers 337a and 337b in the power cylinder 337 communicate with each other. In this state, the steering gear allows manual steering requiring a small steering force. Therefore, steering in an abnormal state is guaranteed and steering during high-speed traveling can be assured, thereby assuring safety.

In the conventional steering gear for a vehicle described above, however, the clutch means for connecting the input and output shafts and the means for halting the power assist function as the steering drive unit are controlled by the sensors and the control device. Therefore, when the sensors fail or the control device malfunctions, manual steering cannot be performed and safe travel cannot be assured. Assume that the pressure-sensitive switch 343 fails to detect a change in pressure under the condition wherein an abnormality occurs in the hydraulic source 338 and a predetermined pressure cannot be obtained. Since the abnormality of the hydraulic source 338 is not detected as an abnormality by the control device 328, the clutch means 325 is not set in an engagement state and steering becomes impossible. Therefore, safe travel is not assured. When the control device 328 malfunctions to halt its function including the fail-safe function, normal steering cannot be performed. In addition, since no abnormality detection signals are output to the actuator 329 in the clutch means 325 and the clutch valve 345, manual steering cannot be performed either.

SUMMARY OF THE INVENTION

It is an object of the present invention to provide a steering gear for a vehicle, wherein steering is allowed to realize safe travel even if a steering drive unit or a steering drive control device fails thereby halting their functions.

In consideration of the above situation, the present invention has been made on the basis of a finding that an electric control system having a high rate of danger is not used but mechanical members having a low rate of failure are mainly used in fail-safe control upon occurrence of an abnormal state of the steering gear for a vehicle, so that safe travel is guaranteed even if the control device or the like fails.

More specifically, a connecting means having a clutch is disposed between an input device and a steering device. The clutch is normally kept in the OFF state. In this state, the steering drive control device controls the steering drive unit in accordance with a steering command from the steering control device, and a steering driving force is transmitted from the steering drive unit to the steering device through a transmission means for the steering driving force. Steering is thus performed. However, when an abnormal state occurs, the abnormal state is mechanically detected by the clutch, and the clutch is changed into the engaging state. A releasable means for the driving unit operation is operated to be mechanically interlocked with a connecting operation such as an engaging operation of the clutch, thereby releasing the force applied from the steering drive unit to the steering device. An electrical system including the steering drive control device is not associated with the above structure at all. Therefore, manual steering which does not require a large steering force counteracting the force applied from the steering drive unit to the steering device can be achieved with high reliability.

Figure 1:
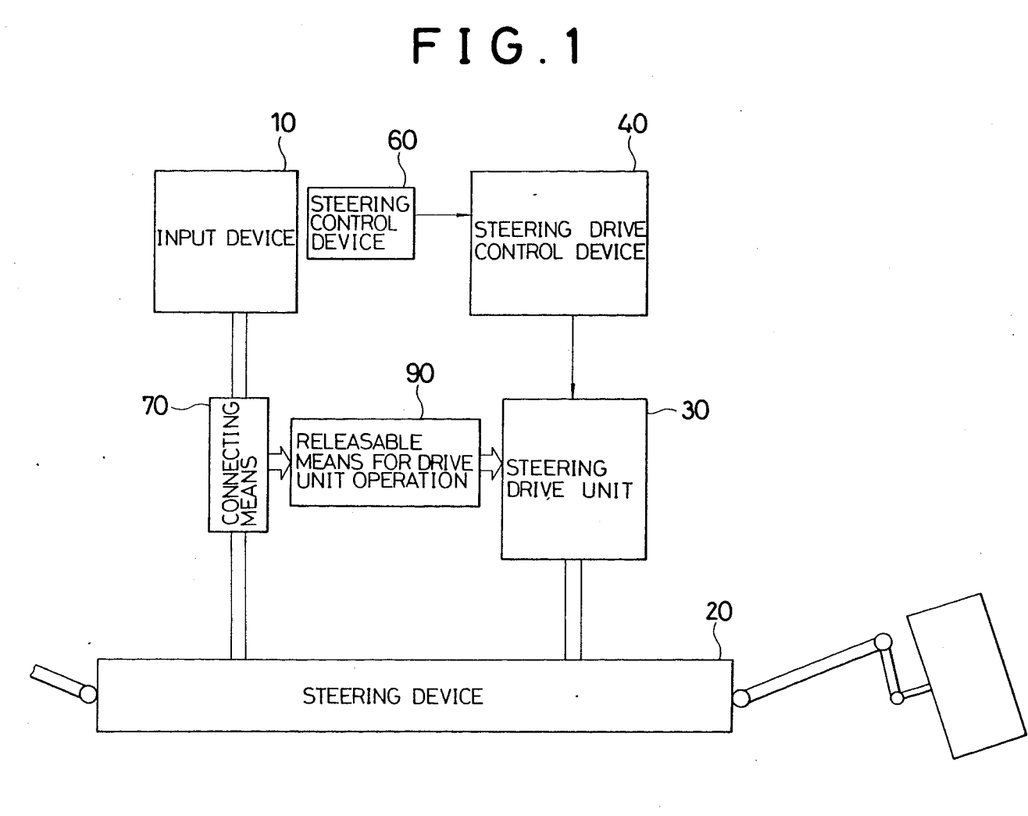
FIG. 1 is a schematic view showing the principle of the present invention.

As shown in FIG. 1, a steering gear for a vehicle according to the present invention including an input device 10 for allowing a driver to enter a steering input, a steering device 20 for changing a steering angle of the wheels so as to perform steering, a steering drive unit 30 having a steering driving force generating means for driving the steering device, a steering drive control device 40 for controlling the steering drive unit 30, and a steering control device 60 for outputting a steering command to the steering drive control device 40 on the basis of a value associated with a steering amount such as a steering input amount entered by the input device 10, comprises: a connecting means 70, including a clutch disposed between the input device 10 and the steering device 20, for mechanically detecting a relative displacement between the input device 10 and the steering device 20, the input device 10 being connected to the steering device 20 by setting the clutch in an engaging state when the relative displacement reaches a predetermined value; and a releasable means 90 for a drive unit operation, mechanically interlocked with the connecting operation of the connecting means 70, for releasing the driving unit operation acting on the steering device 20.

The function and effect of the present invention having the above arrangement are as follows. In the normal mode, the connecting means arranged between the input device and the steering device is held in the OFF, i.e., disengaging state, the releasable means for the drive unit operation is kept disabled, and a driving force of the steering drive unit acts on the steering device. Under these conditions, a steering amount from the steering input detection sensor for detecting an input amount entered by the driver from the input device and a vehicle motion control device for outputting a correction steering signal is input to the steering drive control device 40 as a steering amount command value from the steering control device. The steering drive unit is controlled by the steering drive control device to generate a predetermined steering driving force. The steering driving force is transmitted to the steering device through the transmission means for the steering driving force, thereby steering the wheels.

When the steering drive unit or the steering drive control device fails, i.e., when the mechanically detected relative displacement between the input device and the steering device reaches a predetermined value, the clutch disposed between the input device and the steering device is set in the engaging state. The input device is thus connected to the steering device. The releasable means for the drive unit operation is operated mechanically interlocked with engagement of the clutch to release the steering drive unit from acting on the steering device. The steering device is operated by manual steering which does not require a large steering force counteracting the force applied from the steering drive unit to the steering device. Therefore, manual steering is performed so as to turn the wheels.

The steering gear for a vehicle according to the present invention includes a mechanism interlocked with a mechanical connection between the input device and the steering device to release the steering drive operation acting on the steering device when the steering drive unit or the steering drive control device fails. Manual steering can be performed without requiring an excessive load counteracting the force generated by the steering drive unit. Therefore, reliability of the steering gear can be improved, and safe travel can be guaranteed.

BRIEF DESCRIPTION OF THE DRAWINGS

FIGS. 2 and 3 show a conventional steering gear for a vehicle, in which

FIGS. 4 to 5B show a first embodiment of the present invention, in which

DETAILED DESCRIPTION OF THE PREFERRED EMBODIMENTS

First Mode

According to a first mode of the present invention, a releasable means for a driving unit operation is arranged and operated in the following manner. The releasable means comprises rectangular projections formed on the input device side and rectangular recesses formed on the steering device side so as to locate at both sides of the corresponding projection. When the relative displacement between the input device and the steering device reaches a predetermined value upon occurrence of an abnormal state, the input device is connected to the steering device by meshing of the projections and the recesses. The driving device operation acting on the steering device can be released by an operating amount of projections upon meshing between the projections and the recesses.

The function and effect of the first mode having the above structural feature will be described below.

In the normal operating state, the positions of the projections formed on the input device side in the connecting means arranged between the input device and the steering device are not matched with those of the recesses formed on the steering device side. The input device is disconnected from the steering device. Since the releasable means for the drive unit operation is not operated, steering is performed by the steering drive control device, the steering drive unit, and the steering device in accordance with a steering amount from the steering control device. However, when an abnormality occurs in the steering drive unit, the steering drive control device, and the like and the relative displacement between the input device and the steering device reaches the predetermined value, the positions of the projections on the input device side are matched with those of the recesses on the steering device side. The projections on the input device side are fitted in the corresponding recesses on the steering device side to allow meshing therebetween. The input device is thus connected to the steering device. The releasable means for the drive unit operation is operated by an operating amount of a connection of a member with the projections formed on the input device side. Therefore, the drive unit operation acting on the steering device is released.

With a structure having simple mechanical elements, even if an abnormality occurs in the steering drive unit, the steering drive control device, and the like, manual steering which does not require an excessive steering force can be performed with high reliability.

In the connecting means, the projections formed on the input device side may be recesses and the recesses formed on the steering device side may be projections. In addition, a member operated for connecting the input and steering devices may be arranged on the steering device side to obtain the same effect as described above.

Second Mode

According to a second mode of the present invention, a releasable means for a drive unit operation is arranged and operated as follows. A clutch in a connecting means has a cam shape in each projection mating with a recess when the input device is connected to the steering device. The input device is connected to the steering device in accordance with the cam shape. At the same time, the drive unit operation acting on the steering device can be released.

The function and effect of the second mode having the above structural feature will be described below.

When a relative displacement between the input device and the steering device reaches the predetermined value, the input or steering device side is displaced in accordance with the cam formed on each projection formed on the input or steering device side. The input device is then connected to the steering device. The transmission al means for the steering driving force is operated by the releasable means for the drive unit operation upon the displacement on the input or steering device side in accordance with the cam shape. The drive unit operation acting on the steering device is released.

When the input device is connected to the steering device, the driving force of the steering drive unit which interlocks with the connecting operation to act on the steering device can decrease to zero or a very small value, and this procedure can be controlled by the cam shape of the clutch. When an excess driving force abruptly acts on the steering device to connect the input device with the steering device, an abrupt change in driving force acting on the steering device can be relaxed. At the same time, switching into manual steering upon mechanical connection between the input device and the steering device can be smoothly performed.

The cam may be formed in each recess formed in the connecting means on the input or steering device side to obtain the same function and effect as described above.

Third Mode

According to a third mode of the present invention, a releasable means for a drive unit operation comprises a switching means. The switching means is operated in synchronism with a connecting operation by the connecting means to suppress generation of the driving force from a driving force generating means in a steering drive unit. Therefore, the drive unit operation acting on the steering device is released.

The function and effect of the third mode having the structural feature described above will be described below. In the normal operating state, the switching mean is kept in the ON state. In this state, the driving force is generated by the driving force generating means in the steering drive unit, and the steering device is driven to perform steering. However, when an abnormality occurs in the steering drive unit, the steering drive control device, and the like and the relative displacement between the input device and the steering device exceeds the predetermined value, the connecting means is operated to connect the input device with the steering device. The releasable means for the drive unit operation causes the connecting operation of the connecting means to operate the switching means, thereby turning off the switching means.

The driving force from the driving force generating means in the steering drive unit is stopped, and the driving force from the steering drive unit cannot act on the steering device. Therefore, manual steering which does not require an excessive steering force can be performed.

Fourth Mode

According to a fourth mode of the present invention, a steering drive unit comprises a transmission means for a steering driving force. The transmission means transmits the driving force to a steering device. A releasable means for a drive unit operation is interlocked with a connecting operation of a connecting means to operate the transmission means to release the drive unit operation acting on the steering device.

The function and effect of the fourth mode having the structural feature described above will be described below. In the normal operating state, the transmission means is operated to transmit the driving force from the steering drive unit to the steering device. However, when an abnormality occurs to operate the connecting means and the input device is connected to the steering device, the releasable means for the drive unit operation is interlocked with an operation of the connecting means to operate the transmission means for the steering driving force. Transmission of the driving force from the steering drive unit to the steering device is interrupted.

The drive unit operation acting on the steering device can be released, and manual steering which does not require an excessive steering force can be performed.

Fifth Mode

According to a fifth mode of the present invention, a connecting means comprises a connection releasable means having a connection releasable member for releasing a connection between an input device and a steering device. The releasable means is operated to release the connection between the input device and the steering device and the functional halt of the steering drive unit. The state prior to the connection between the input and steering devices is restored. An apparatus of this mode can be operated outside the connecting means or the releasable means for the drive unit operation.

The function and effect of the fifth mode having the structural feature described above will be described below.

After the input device is connected to the steering device, the connection therebetween is released upon an operation of the releasable means and at the same time the function of the releasable means interlocked with the connecting means is also released. The driving force from the steering drive unit acts on the steering device, and the normal steering state is restored.

If manual steering is no longer required, assuming that a wheel gets into a ditch or the like, the connection between the input and steering devices is performed, and then the wheel is removed from the ditch, or assuming that the function of the failed device is restored to allow normal steering, normal steering can be restored by the releasable means.

Since the releasable means for the drive unit operation is interlocked with the connecting means, the releasable means may comprise the releasable means for the connection between the input and steering devices.

EMBODIMENTS

First Embodiment

A steering gear according to a first embodiment belonging to the first and third modes of the present invention will be described with reference to FIGS. 4 to 5B.

Figure 4:
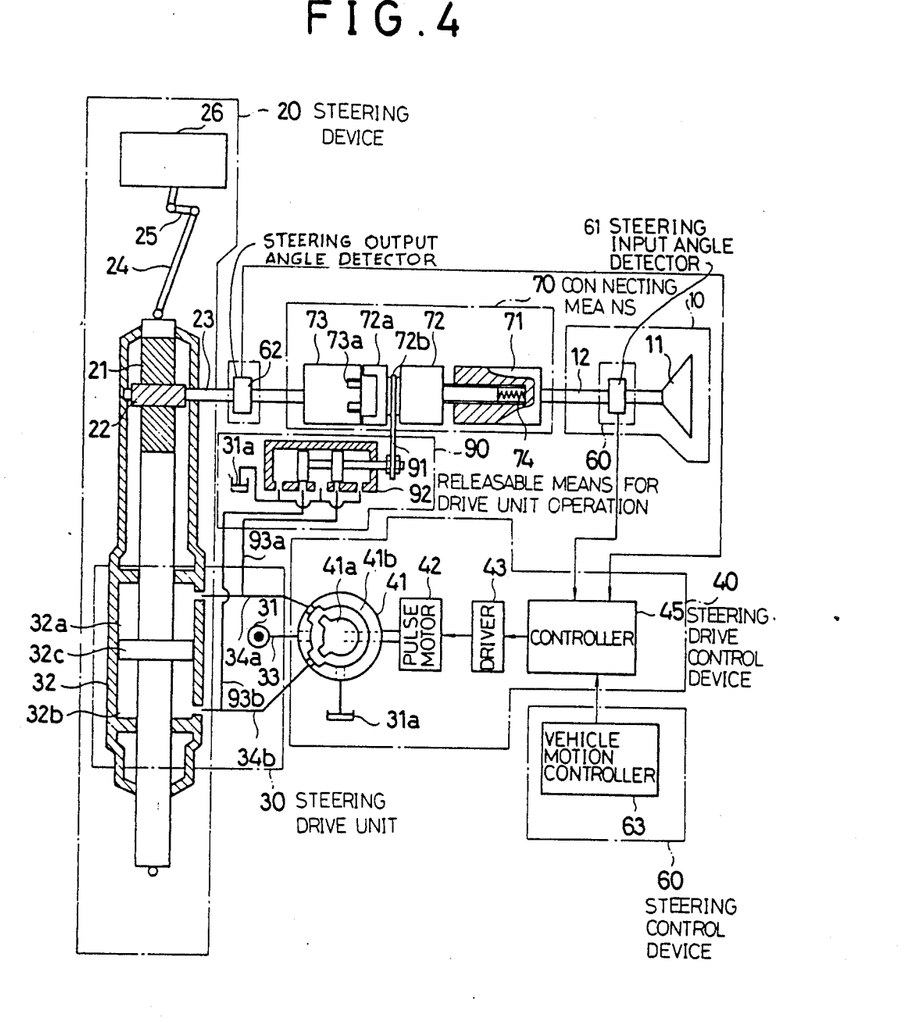
FIG. 4 is a schematic view, of a steering gear for a vehicle.

As shown in FIG. 4, the steering gear for a vehicle of this embodiment comprises an input device 10, a steering device 20, a steering drive unit 30, a steering drive control device 40, a steering control device 60, a connecting means 70 for connecting the input and steering devices 10 and 20, and a releasable means 90 for a drive unit operation.

The input device 10 comprises a steering wheel 11 and an input shaft 12 coupled to the steering wheel 11.

The steering device 20 comprises a pinion shaft 23, a pinion 22 connected to the pinion shaft 23, a rack 21 meshed with the pinion 22, and a knuckle arm 25 for converting a linear displacement of the rack 21 into an angular displacement of a wheel 26 through a tie rod 24.

The steering drive unit 30 comprises a power cylinder 32 having a power piston 32c coupled to the rack 21, and pipes 33, 34a and 34b for causing a hydraulic source 31 to communicate with oil chambers 32a and 32b in the power cylinder 32 which are separated by a power piston 32c.

The steering drive control device 40 comprises a rotary four-way valve 41, a pulse motor 42 for driving the rotary four-way valve 41, a driver 43 for driving the pulse motor 42, and a controller 45. The rotary four-way valve 41 comprises an inner valve 41a and an outer valve 41b. The shaft of the inner valve 41a is connected to the rotating shaft of the pulse motor 42. The inner valve 41a is rotated upon rotation of the pulse motor 42, and the restrictor opening of the rotary four-way valve 41 can be changed.

The steering control device 60 comprises an input steering angle detector 61 for detecting an input steering angle from the steering wheel 11 and outputting a steering input signal to the controller 45, an output steering angle detector 62 for converting an actual steering angle of the wheel 26 into a rotational angle of the steering wheel 11 and outputting a detected signal to the controller 45, and a vehicle motion control device 63 for outputting a steering signal to the controller 45 so as to improve steering characteristics such as vehicle traveling stability against disturbance, improve response and stability for a steering input, and hence improve characteristics of vehicle motion.

The connecting means 70 comprises a sleeve 71, one end of which is connected to the input shaft 12, an input connecting member 72, one end of which is inserted into the sleeve 71 by spline fitting, the other end of which has projections 72a, and an intermediate portion of which has a drive unit driving force preventive groove 72b, a steering connecting member 73, one end of which is connected to the pinion shaft 23, and the other end surface of which has recesses 73a, and a spring 74 inserted between the sleeve 71 and the input connecting member 72 to always bias the input connecting member 72 against the steering connecting member 73 so as to connect the input connecting member 72 to the steering connecting member 73 in an abnormal state.

The releasable means 90 for the drive unit operation comprises a drive unit operation releasable ring lever 91 mounted in the drive unit operation releasable groove 72b in the input connecting member 72 so as to be free from rotation of the input connecting member 72, a drive unit operation releasable valve 92 serving as a switching means for controlling the ON/OFF operation of the driving function of the steering drive unit, a pipe 93a for connecting the drive unit operation releasable valve 92 and the pipe 34a for supplying/discharging oil from the four-way valve 41 to the oil chamber 32a in the power cylinder 32, and a pipe 93b for connecting the drive unit operation releasable valve 92 and a pipe 34b for supplying/discharging oil from the four-way valve 41 to the oil chamber 32b in the power cylinder 32.

The operation of the steering gear for a vehicle according the first embodiment will be described below.

Figure 5A:
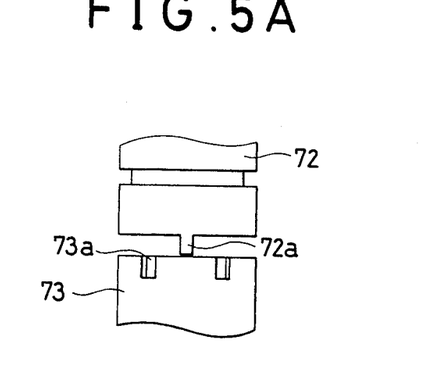
FIGS. 5A and 5B are a plan view and a sectional view showing part of the steering gear.
Figure 5B:
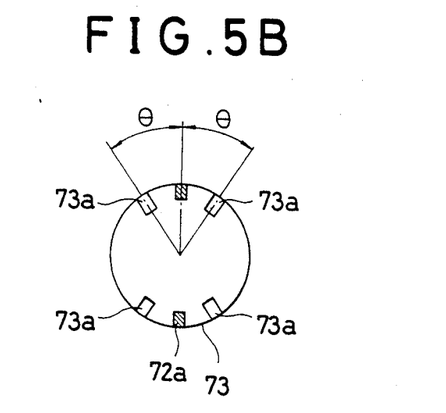

The positions of the projections 72a of the input connecting member 72 are staggered from those of recesses 73a of the steering connecting member 73 such that one projection 72a is located between the adjacent recesses 73a, as shown in FIGS. 5A and 5B when the vehicle travels straight. When the input shaft 12 is rotated or the rack 21 in the steering device 20 is operated in accordance with an auxiliary steering signal from the vehicle motion control device 63 and hence the pinion 22 is rotated, each projection 72a is located within the angular range of $2\theta$ between the adjacent recesses 73a. It should be noted that an angle from the neutral position to a position where each projection 72a of the input connecting member 72 is fitted in the corresponding recess 73a of the steering connecting member 73 is set to be larger than an input shaft angle equivalent steering amount representing by the auxiliary steering signal output from the vehicle motion control device 63.

When the rotary four-way valve 41 is set in the neutral state, as shown in FIG. 4, restrictor openings of the four restrictors constituted by two projections on the inner valve 41a and the two recesses on the outer valve 41b are equal to each other. The oil from the hydraulic source 31 is supplied to a tank 31a through these restrictors and does not act on the power piston 32c in the power cylinder 32. When a driver turns the steering wheel 11, its steering angle is detected by the input steering angle detector 61. A detection signal is output to the controller 45. In response to this signal, the controller 45 causes the pulse motor 42 to rotate to control the restrictor openings of the rotary four-way valve 41. The pressure in one of the oil chambers 32a and 32b is increased by the oil supplied from the hydraulic source 31. A force acts on the power piston 32c. When this force exceeds a load of the wheel 26, the power piston 32c and the rack 21 connected thereto are moved.

Therefore, the wheel 26 is steered through the tie rod 24 and the knuckle arm 25. In this case, movement of the power piston 32c is converted into rotational movement of the pinion shaft 23 through the rack 21 and the pinion 22. The rotational angle signal is input from the output steering angle detector 62 to the controller 45 and is compared with a signal from the input angle detector 61.

This steering mechanism is operated in the same manner as in a case wherein a steering command signal is output from the vehicle motion control device 63.

In normal steering operation, the projections 72a of the input connecting member 72 are located between the corresponding adjacent recesses 73a of the steering connecting member 73. However, assume that the controller 45, the pulse motor 42, or the like fails, a pressure acts on one oil chamber in the power cylinder 32, and the power piston 32c and the rack 21 connected thereto are moved despite the will of the driver or the vehicle motion control device 63. Assume that the pressure no longer acts on the oil chamber in the power cylinder even if the steering signal is output from the input steering angle detector 61 and the vehicle motion control device 63. In such a case, the relative angular displacement of the input shaft 12 and the pinion shaft 23 is excessively increased, i.e., the projections 72a of the input connecting member 72 come closer to the recesses 73a of the steering connecting member 73, and each projection 72a of the input connecting member 72 comes closer to one of the adjacent recesses 73a of the steering connecting member 73. Since the input connecting member 72 is biased by the spring 74 toward the steering connecting member 73, each projection 72a of the input connecting member 72 is fitted in one of the adjacent recesses 73a of the steering connecting member 73. Therefore, the input device 10 is connected to the steering device 20. The drive unit operation releasable ring lever 91 fitted in the drive unit operation releasable groove 72b drives the drive unit operation releasable valve 92. The oil chambers 32a and 32b in the power cylinder 32 are connected to tank 31a. Then, no oil pressure acts on the power piston 32c, and the power cylinder function is stopped. Therefore, even if an excessive pressure acts on one of the oil chambers 32a and 32b, the operation of the power piston 32c by the hydraulic pressure can be prevented, and manual steering which does not require an excessive steering force can be performed.

Second Embodiment

A steering gear for a vehicle according to a second embodiment belonging to the first and third modes of the present invention will be described with reference to FIG. 6. A description will be concentrated on differences between the first and second embodiments. A major difference between the first and second embodiments is that a connecting means is of a type in which a pin is inserted in a steering device with a recess portion in the second embodiment. In addition, in the second embodiment, an electrical system including sensors and an electrical control device is not used. The function of the steering control device is performed by the input device. Therefore, the steering gear of the second embodiment does not include the steering control device.

Figure 6:
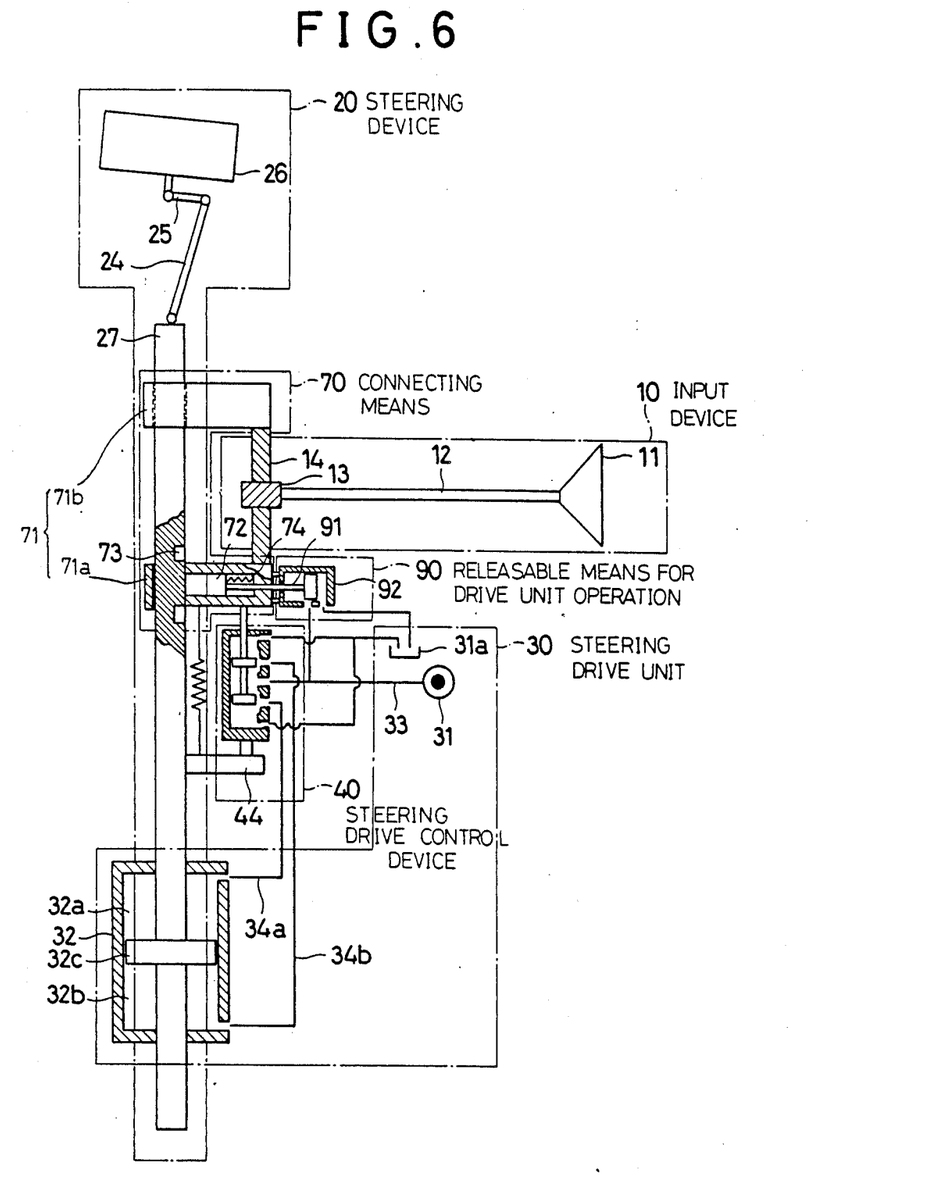
FIG. 6 is a schematic view of a second embodiment of the present invention.

More specifically, as shown in FIG. 6, the steering gear for a vehicle of the second embodiment comprises an input device 10, a steering device 20, a steering drive unit 30, a steering drive control device 40, a means 70 for connecting the input device 10 and the steering device 20, and a releasable means 90 for the steering drive unit.

The input device 10 comprises a steering wheel 11, an input shaft 12 connected to the steering wheel 11, a pinion 13 connected to the input shaft 12, and a rack 14 meshed with the pinion 13.

The steering device 20 comprises a knuckle arm 25 for converting a linear displacement of a steering rod 27 into an angular displacement of a wheel 26 through a tie rod 24.

The steering drive unit 30 comprises a hydraulic source 31 having a tank 31a, a power cylinder 32 having a power piston 32c coupled to the steering rod 27, and pipes 33, 34a, and 34b for connecting the steering drive control device 40 with the hydraulic source 31 and oil chambers 32a and 32b (in the power cylinder 32) separated by the power piston 32c.

The steering drive control device 40 comprises a spool type control valve 41 and a sleeve support rod 44 mounted on the steering rod for supporting an outer valve 41b. The control valve 41 comprises the outer valve 41b and an inner valve 41a.

The connecting means 70 comprises a rack support rod 71, an input connecting member 72, two recessed steering connecting members 73, and a spring 74. The rack support rod 71 comprises a rod 71a for slidably supporting the rack 14 in a direction parallel to the axis of the steering rod 27 and for supporting one end of the rack 14, and a rod 71b for supporting the other end of the rack 14. The input connecting member 72 is fitted in the rack support rod 71a. The steering connecting members 73 are respectively arranged at two positions of both sides of the rack support rod 71a. The spring 74 is inserted in the rack support rod 71a and always biases the input connecting member 72 toward the steering connecting members 73 so as to connect the input connecting member 72 to the steering connecting members 73 in an abnormal state.

The releasable means 90 for the drive unit operation comprises a drive unit operation releasable bar 91 mounted on the input connecting member 72, a drive unit operation releasable valve 92 serving as a switching means for controlling the ON/OFF operation of the driving function of the steering drive unit, and a pipe 93 for connecting the drive unit operation releasable valve 92 and a pipe 33 for connecting the hydraulic source 31 and the spool type control valve 41.

An operation of the steering gear for a vehicle according to the second embodiment of the present invention will be described below.

The relative positional relationship between the input connecting member 72 and the steering connecting members 73 in the normal operating state is given such that the input connecting member 72 is located in the middle position between the two steering connecting members 73 during straight traveling, as shown in FIG. 6. However, when a steering input is entered with the steering wheel 11 or an external force such as disturbance acts on the wheel 26, the input connecting member 72 is located between the two steering connecting members 73.

When the driver turns the steering wheel 11, the pinion 13 is rotated and the rack 14 is displaced accordingly. An inner valve 41a in the spool type control valve 41 is displaced through the rack support rod 71a upon a displacement of the rack 14 (FIG. 4). When the inner valve 41a is displaced, the oil from the hydraulic source 31 is supplied to the oil chamber 32a or 32b in the power cylinder 32. The pressure of the oil chamber supplied with the oil is increased, and this pressure then acts on the power piston 32c. The steering rod 27 coupled to the power piston 32c is moved, and the wheel 26 is then steered through the tie rod 24 and the knuckle arm 25. Movement of the steering rod 27 is mechanically fed back to the spool type control valve 41 through the sleeve support rod 44. Steering according to the steering input from the steering wheel 11 is performed.

As opposed to the normal steering described above, assume that the hydraulic source 31 fails to generate a predetermined pressure and then the power cylinder 32 fails to perform the steering drive function corresponding to the steering input from the steering wheel 11. Also assume that the spool type control valve 41 fails and causes an unnecessary pressure to act on the oil chamber 32a or 32b in the power cylinder 32 and then the steering rod 27 is moved to perform steering which does not correspond to the steering input from the steering wheel 11, thus causing an abnormal state In such a case, the input connecting member 27 comes close to one of the two steering connecting member 73. Finally, the relative displacement between the input connecting member 72 and the steering connecting members 73 becomes zero and the input connecting member 72 is connected to the steering connecting members 73. Therefore, manual steering can be performed. In this case, movement of the input connecting member 72 actuates the drive unit operation releasable valve 92 through the drive unit operation releasable bar 91, and the oil supposed to be supplied from the hydraulic source 31 to the spool type control valve 41 is supplied to the drain 31a. Even if an unnecessary pressure acts on the oil chamber 32a or 32b in the power cylinder 32, the force acting on the power piston 32c can be eliminated. A mechanism in this operation will be described in detail. When the inner valve 41a in the spool type control valve 41 is moved to a position higher than that of the outer valve 41b in FIG. 6 and cannot be returned to a position lower than that of the outer valve 41b, the oil from the hydraulic source 31 is supplied from the pipe 33 to the spool type control valve 41 and is supplied to the oil chamber 32b in the power cylinder 32 through the pipe 34b. In this case, when the drive unit driving force preventive valve 92 is operated, the oil from the hydraulic source 31 is supplied to the drain 31a midway along the pipe 33, and the pressure in the oil chamber 32b in the power cylinder 32 is not increased. In the above-mentioned state of the spool type control valve 41, the oil in the oil chamber 32a in the power cylinder 32 is supplied to the drain 31a through the pipe 34a. The pressure in the oil chamber 32a in the power cylinder 32 is not increased. Therefore, no force acts on the power piston 32c, and manual steering which does not require an excessive steering force can be performed.

Third Embodiment

A steering gear for a vehicle according to a third embodiment belonging to the first and fourth modes of the present invention will be described with reference to FIG. 7. A description will be concentrated on differences between the first and third embodiments. A major difference between the first and third embodiments is that the releasable means for the drive unit operation is not constituted by a switching means but operated by a transmission means for the steering driving force in the third embodiment. The steering drive unit is not of a hydraulic type but of an electric type using an electric motor.

Figure 7:
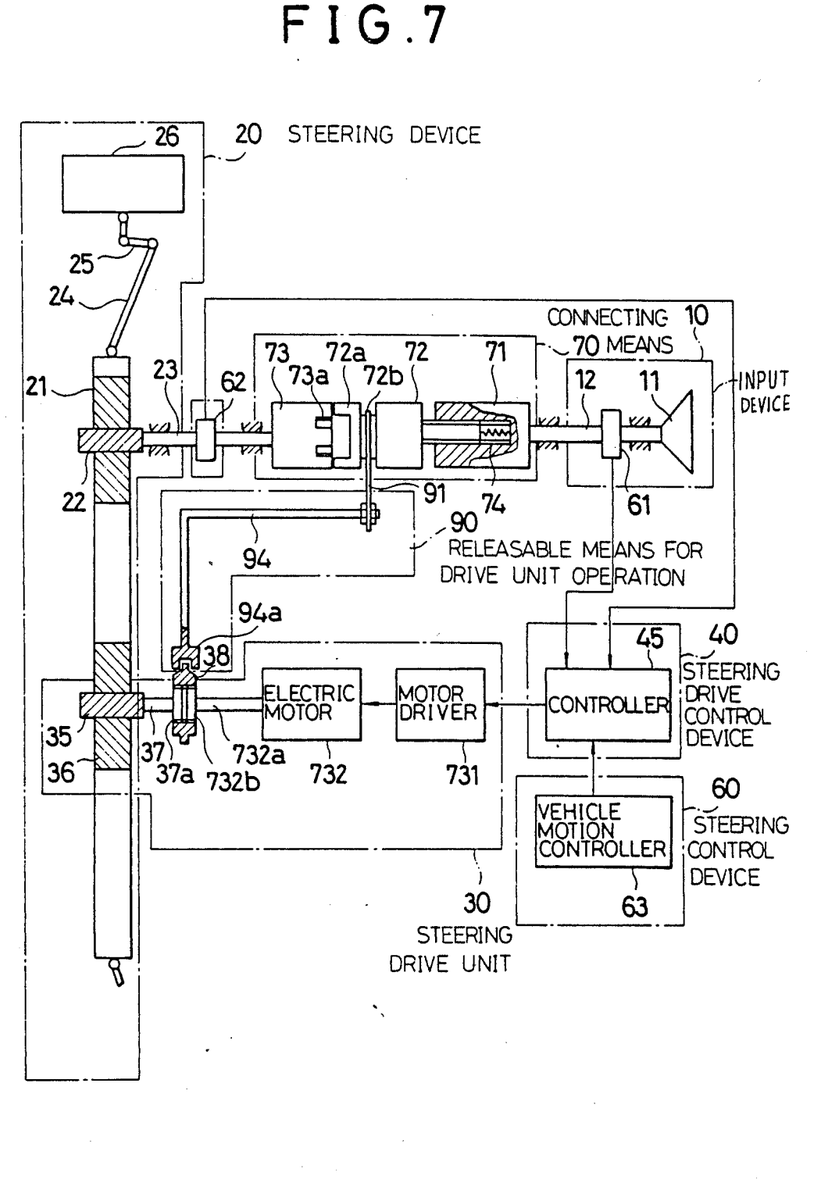
FIG. 7 is a schematic view of a third embodiment of the present invention.

A steering gear for a vehicle according to the third embodiment comprises an input device 10, a steering device 20, a steering drive unit 30, a steering drive control device 40, a steering control device 60, a means 70 for connecting the input and steering devices 10 and 20, and a releasable means 90 for a drive unit operation, as shown in FIG. 7.

The input device 10 comprises a steering wheel 11 and an input shaft 12 connected to the steering wheel 11.

The steering device 20 comprises a pinion shaft 23, a pinion 22 connected to the pinion shaft 23, a rack 21 meshed with the pinion 22, and a knuckle arm 25 for converting a linear displacement of the rack 21 into an angular displacement of a wheel 26 through a tie rod 24.

The steering drive unit 30 comprises: an electric motor 732 having an output shaft 732a and a flange 732b connected to the output shaft 732a and having a splined outer surface; a driver 731 for the electric motor 732; a pinion 35 for transmitting a driving force from the electric motor 732 to the steering device 20; a rack 36 formed on a steering rod in the same manner as in the rack 21 and meshed with the pinion 35; a pinion shaft 37 connected to the pinion 35; a flange 37a connected to the pinion shaft 37 and having a splined outer surface; and a sleeve 38 having a splined inner surface so as to mesh with the flanges 732b and 37a. The flanges 732b and 37a, and the sleeve 38 constitute a transmission means for the steering driving force.

The steering drive control device 40 includes a controller 45.

The steering control device 60 comprises: a steering input angle detector 61 for detecting an input steering angle from the steering wheel 11 and outputting an input steering signal to the controller 45; an output steering angle detector 62, arranged on the pinion shaft 23, for converting an actual steering angle of the wheel 26 into a rotational angle of the steering wheel 11 and outputting an output steering angle signal to the controller 45; and a vehicle motion control device 63 having a function for outputting a steering signal to the controller 45 so as to improve steering characteristics such as improvement of vehicle traveling stability against disturbance and improvement of response and stability for the steering input, and hence improvement of the vehicle motion characteristics.

The connecting means 70 comprises: a sleeve 71, one end of which is connected to the input shaft 12; an input connecting member 72, one end of which is inserted into the sleeve 71 by spline fitting, the other end of which has projections 72a, and the intermediate portion of which has a drive unit operation releasable groove 72b; a steering connecting member 73, one end of which is connected to the pinion shaft 23 and the other end face of which has recesses 73a; and a spring 74, inserted between the sleeve 71 and the input connecting member 72, for always biasing the input connecting member 72 toward the steering connecting member 73 so as to connect the input connecting member 72 to the steering connecting member 73.

The drive unit operation releasable means 90 comprises: a ring-like drive unit operation releasable ring lever 91 fitted in the drive unit operation releasable groove 72b in the input connecting member 72 and free from rotation of the input connecting member 72; and a drive unit operation releasable lever 94 for controlling the ON/OFF operation of the transmission means for the steering driving force. One end of the lever 94 is connected to the drive unit operation releasable ring lever 91. The other end of the lever 94 is used to operate the sleeve 38 in the transmission means for the steering driving force through a fork 94a.

An operation of the steering gear for the vehicle according to the third embodiment described above will be described below.

The relative positional relationship between the projections 72a of the input connecting member 72 and the recesses 73a of the steering connecting member 73 in the normal operation is the same as that of the first embodiment. In the state of straight drive angle between a position where each projection 72a of the input connecting member 72 is located between the adjacent recesses 73a of the steering connecting member 73 and a position where each projection 72a is fitted in the corresponding recess 73a is larger than an input shaft equivalent steering angle of a maximum amount of steering output from the vehicle motion control device 63, as described in the first embodiment. In the normal operating state, the sleeve 38 is meshed with the splines of the flanges 732b and 37a to transmit the driving force from the electric motor 32 to the steering device 20.

When a driver turns the steering wheel 11, the input steering angle detector 61 detects its rotational angle and outputs a detection signal to the controller 45. The controller 45 outputs a signal to the motor driver 731 for the electric motor 732 to drive the electric motor 732. Rotation of the electric motor 732 causes steering of the wheel 26 through the output shaft 732a, the flange 732b, the sleeve 38, the flange 37a, the pinion shaft 37, the pinion 35, and the rack 36 formed in the steering device 20. In this case, the steering angle of the wheel 26 is converted into a rotational angle of the pinion shaft 23 through the rack 21 formed on the steering rod and through the pinion 22 meshed with the rack 21. The rotational angle signal is input from the output steering angle detector 62 to the controller 45 and is compared with the signal from the input steering angle detector 61. Therefore, steering corresponding to the signal from the input steering angle detector 61 is performed.

The steering mechanism is the same as in the case wherein the steering command signal is output from the vehicle motion control device 63.

In normal steering, each projection on the input connecting member 72 is located between the adjacent recesses 73a on the steering connecting member 73. When the controller 45, the electric motor 732, its driver 731, or the like fails, and steering according to the steering command signal cannot be performed, i.e., when steering is performed by the motor 732 although the steering command signal is not output or when steering is not performed by the electric motor 732 although the steering command signal is output, the relative angular displacement of the input shaft 12 and the pinion shaft 23 is excessively increased, i.e., each projection 72a on the input connecting member 72 comes closer to the recess 73a on the steering connecting member 73 and finally each projection 72a is fitted in one of the adjacent recesses 73a on the steering connecting member 73. The input connecting member 72 is urged toward the steering connecting member 73 by the spring 74, and each projection 72a on the input connecting member 72 is fitted in one of the adjacent recesses 73a on the steering connecting member 73. The input device 10 is thus connected to the steering device 20. At the same time, the drive unit operation releasable ring lever 91 fitted in the drive unit operation releasable groove 72b is operated to move the sleeve 38 in the releasable means for the steering driving force. The flange 732b mounted on the output shaft 32a of the electric motor 732 is disengaged from the sleeve 38. Therefore, the steering device is disengaged from the steering drive unit. In this manner, manual steering which does not require an excessive steering force can be performed.

First Modification

In the first to third embodiments, an abnormal state of the steering function is detected by a relative displacement between the input and steering devices, and the connecting means is used to connect the connecting device to the steering device. A clutch having a cam shape may be employed in the input means.

A modification obtained by applying the steering gear for the vehicle of the first embodiment belonging to the first and third modes to the second mode will be described with reference to FIG. 8. A description will be concentrated on differences between this modification and the first embodiment.

Figure 8:
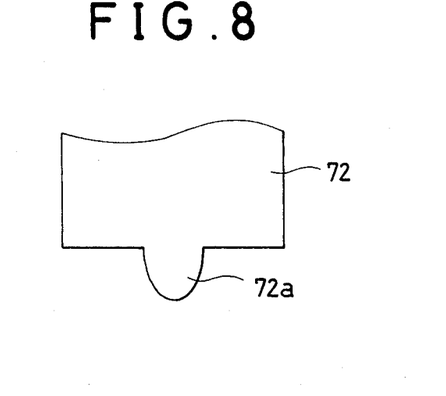
FIG. 8 is a sectional view showing part of a first modification of the first embodiment of the present invention.

Referring to FIG. 8, a connecting means 70 comprises an input connecting member 72 having projections 72a each having a cam-shaped distal end.

When the relative displacement between the input connecting member 72 and the steering connecting member 73 exceeds a predetermined value to connect the input connecting member 72 to the steering connecting member 73, the drive unit operation releasable valve 92 interlocked with the input connecting member 72 actuates the drive unit operation releasable valve 92 in accordance with the cam shape shown in FIG. 8 as the relative displacement between the input and steering connecting members 72 and 73 is increased.

Since the drive unit operation releasable valve 92 is operated in accordance with the cam shape when the input connecting member 72 is to be connected to the steering connecting member 73, a decrease in force acting on the power piston 32c can be decelerated, and manual steering can be smoothly set.

Similarly, this modification may be applied to the second and third embodiments of the present invention.

Second Modification

A means for releasing the connection between the input device and the steering device may be applied to the connecting means in the first to third embodiments.

The steering gear for the vehicle according to the first embodiment belonging to the first and third modes may be applied to the fifth mode to obtain a second modification. The second modification will be described in detail with reference to FIG. 9, and a description will be concentrated on differences between the modification and the first embodiment.

Figure 9:
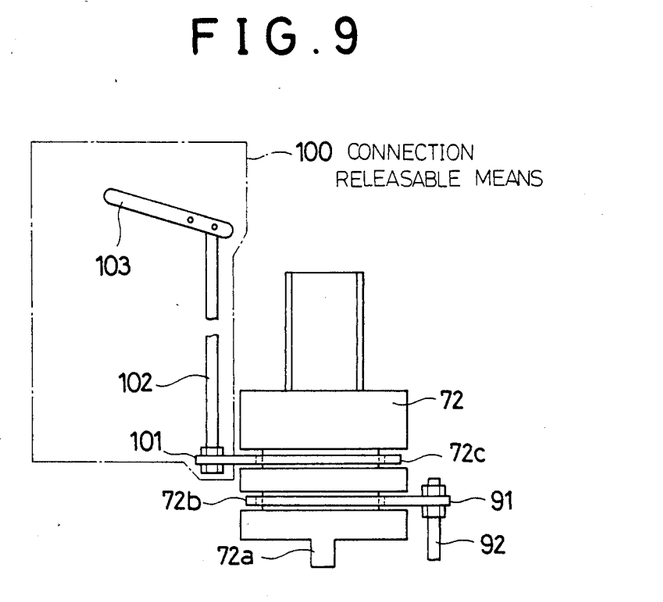
FIG. 9 is a plan view showing part of a connecting means according to a second modification of the first embodiment of the present invention.

A connection releasable means 100 comprises a connection releasable ring lever 101 fitted in a connection releasable groove 72c formed in the input connecting member 72 in the connecting means 70 to allow rotation of the member 72, and a connection releasable lever 103 connected to the connection releasable ring lever 101 through a wire 102.

When manual steering is no longer required, the connection releasable lever 103 is operated to disengage the projections 72a on the input connecting member 72 from the recesses 73a in the steering connecting member 73. At the same time, the steering wheel 11 is slightly turned to disengage the input connecting member 72 from the steering connecting member 73. As is apparent from the description made in the first embodiment, when the projections 72a on the input connecting member 72 are disengaged from the recesses 73a in the steering connecting member 73, the function of the power cylinder 32 as the steering drive unit can be restored.

The connection releasable lever is operated to easily restore the steering gear in the normal state when a large external force (e.g., a wheel gets in a ditch) acts on the steering device 20 to connect the input connecting member 72 to the steering connecting member 73 or the normal operation of the steering gear is confirmed.

Similarly, this modification may be applied to the second and third embodiments.

Third Modification

The driving force transmission route may be changed in the third embodiment to simplify the arrangement of the releasable means for the drive unit operation.

Figure 10:
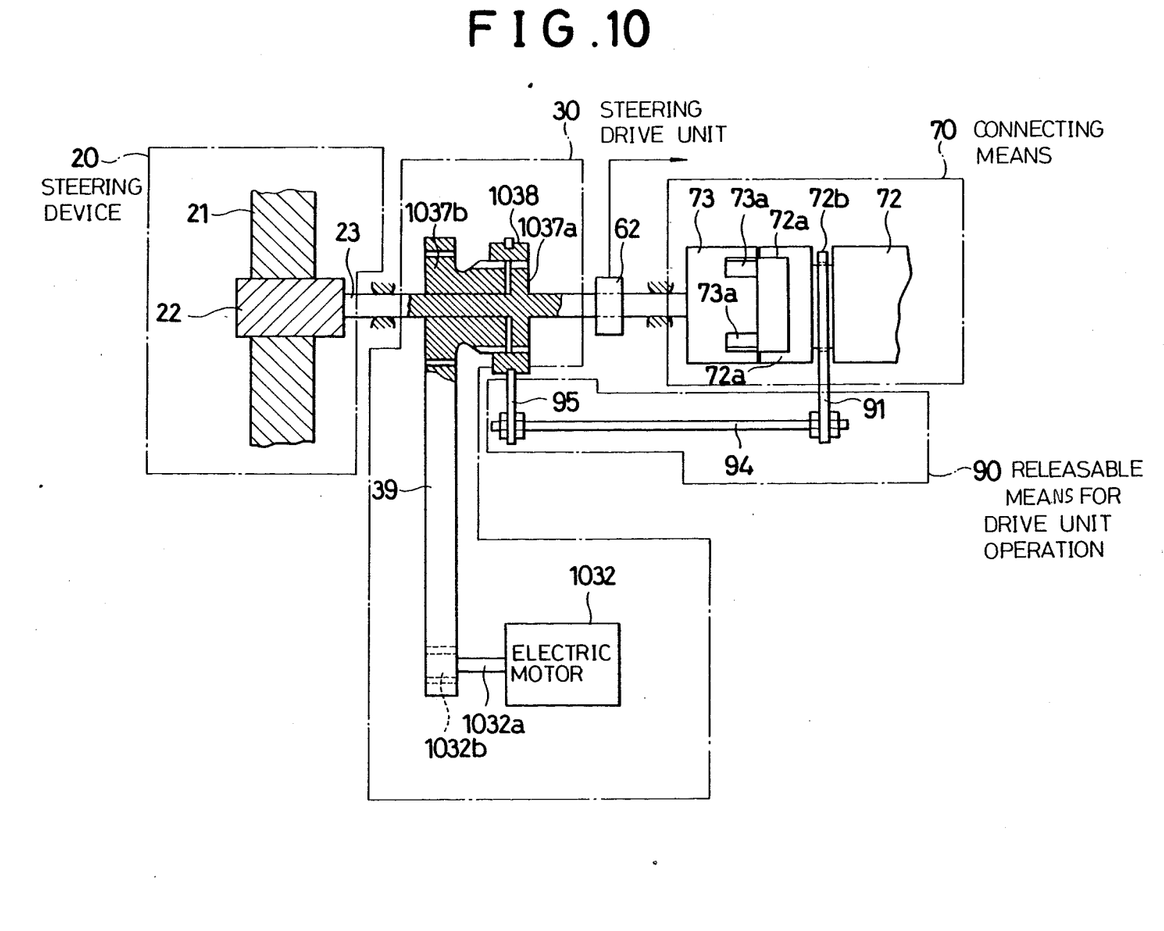
FIG. 10 is a schematic view showing a third modification of the first embodiment according to the present invention.

A modification obtained by modifying the driving force transmission route in the steering gear for the vehicle of the third embodiment belonging to the first and fourth modes will be described with reference to FIG. 10. A description will be concentrated on differences between this modification and the third embodiment.

The driving force from the steering drive unit 30 is transmitted to the pinion shaft 23 in the steering device 20, and the releasable means 90 for the drive unit operation is arranged on the pinion shaft 23. The steering drive unit 30 comprises: a flange 1037a fixed on the pinion shaft 23 and having a splined outer surface; a pulley 1037b which is freely rotatable on the pinion shaft 23, has a spline on the outer peripheral surface adjacent to the flange 1037a, and having teeth for a toothed belt on the other end face thereof; a sleeve 1038 having a splined inner surface so as to mesh with the splines of the flange 1037a and the pulley 1037b; and a toothed belt 1039 for transmitting the driving force of the electric motor 1032 to the pulley 1037b through a gear 1032b connected to an output shaft 1032a of the electric motor 1032. The releasable means 90 for the drive unit operation comprises: a drive unit operation releasable ring lever 91; and a sleeve ring lever 95 mounted on the sleeve 1038 and the drive unit operation releasable lever 94 so as not to adversely affect rotation of the sleeve 38.

An operation of the steering gear for the vehicle according to the third modification will be described below.

In the normal state, the sleeve 1038 allows spline connection between the flange 1037a and the pulley 1037b. A driving force from the electric motor 1032 is transmitted to the rack 21 through the toothed belt 1039, the pulley 1037b, the sleeve 1038, the flange 1037a, the pinion shaft 23, and the pinion 22.

When the input connecting member 72 is connected to the steering connecting member 73, movement of the input connecting member 72 during connection allows movement of the sleeve 1038 in a direction opposite to that of the flange 1037a through the drive unit operation releasable ring lever 91, the drive unit operation releasable lever 94, and the sleeve ring lever 95. The pulley 1037b can be disengaged from the flange 1037a. Therefore, the flange, i.e., the pinion shaft 23 can be freely rotated with respect to the pulley 1037b and is free from the driving force from the electric motor 1032.

The driving force transmission route is changed to simplify the structure of the releasable means for the drive unit operation, and more accurate operation can be assured.

What is claimed is:

1. A steering gear for a vehicle comprising
an input device for receiving steering input from a driver,
a steering device coupled to the wheels of the vehicle for changing the steering angle of said wheels,
a steering drive unit including force generating means for driving said steering device,
a steering drive control device for operating said steering drive unit,
control means for controlling said steering drive control device on the basis of steering magnitude,
connecting means comprising two opposed members respectively coupled to the input device and the steering device, and
clutch means for selectively operatively connecting said two opposed members and thereby said input device and said steering device, said clutch means mechanically detecting relative displacement between said input device and said steering device and setting said clutch means in an engaged state in which the input device and steering device are operatively coupled when the relative displacement between the input device and the steering device reaches a predetermined abnormal value, said input device directly driving said steering device in said engaged state of said clutch means,
said two opposed members being movable relative to one another in a normal operation with said clutch means disengaged, said clutch means comprising a fitting portion on one of said members at a position corresponding to an abnormal value of relative displacement between said input device and said steering device, said two members being fitted together by said fitting portions to be integrally operable for both directions of movement of said members when the relative displacement between said input device and said steering device reaches said abnormal value,
releasable means for releasing said steering drive unit from said steering device, and
mechanical means for mechanically responding to the fitted condition of said two members for operating said releasable means when the clutch means achieves the engaged state whereby the input device is directly coupled to the steering device and the steering drive unit is released from the steering device.

2. A steering gear according to claim 1 wherein one of said two members is coupled to said input device and the other member is coupled to said steering device, said fitting portion comprising rectangular projections formed on said one member and rectangular recesses formed on said other member such that when the relative displacement between said input device and said steering device reaches the predetermined abnormal value said projections are engaged with said recesses to connect said input device to said steering device and said mechanical means acts on said releasable means to release said drive unit from said steering device by the movement of said projections during engagement with said recesses.

3. A steering device according to claim 1, wherein said fitting portion comprises cam-shaped mating projections, said releasable means selectively releasing said steering drive unit and said steering device in accordance with the cam shape of said mating projections.

4. A steering gear according to claim 1, wherein said releasable means comprises: a ring lever, said one member having a groove engaged by said ring lever such that said one member is freely rotatable with respect to said ring lever, a valve connected to said lever, and a hydraulic line connecting said valve to a line for performing oil supply/discharge from a control valve in said steering drive control device to an oil chamber in a power cylinder in said steering drive unit.

5. A steering gear according to claim 1, wherein said releasable means comprises switching means which is operated to control generation of a driving force by said force generating means in said steering drive unit, thereby releasing said steering drive unit from said steering device.

6. A steering gear according to claim 5, wherein said force generating means comprises an electric motor.

7. A steering gear according to claim 1, wherein one member of said connecting means comprises a steering connecting member having a hole and mounted on a steering driving rod, an input connecting member having a pin fitted in said hole, and a rack, driven by a pinion in said input device, for driving said pin.

8. A steering gear according to claim 1, wherein said releasable means comprises a releasable bar interlocked with said input device, a valve constituting a switching means for controlling ON/OFF operation of said steering drive unit, and a communication pipe connecting said valve and a line for connecting a hydraulic source and said steering drive control device.

9. A steering device according to claim 1, wherein said steering drive unit comprises transmission means for transmitting a steering driving force to said steering device, and said releasable means is interlocked with the operation of said connecting means to actuate said transmission means to release said steering drive unit from said steering device.

10. A steering gear according to claim 1, wherein said connecting means comprises connection releasable means having a connection releasable member for releasing the connection between said input device and said steering device, said connection releasable means being operated to release the connection between said input device and said steering device and a functional halt of said steering drive unit, thereby restoring a state prior to the connection between said input device and said steering device.

11. A steering gear according to claim 10, wherein said connection releasable member comprises a connection releasable ring lever fitted in a connection releasable groove formed in said member coupled to said input device, a connection releasable lever, and a wire connecting said connection releasable ring lever and said connection releasable lever.

12. A steering gear according to claim 1, wherein said releasable means comprises a groove formed in the member coupled to the input device, a ring lever fitted in said groove so as to be free from rotation of said member coupled to the input device, a sleeve ring lever having one end connected to the other of said two members and another end fixed to a pinion shaft connected to a drive pinion in said steering device, said sleeve ring leer being in spline engagement with said pinion shaft, and a lever connected to said ring lever and said sleeve ring lever.

13. A steering gear according to claim 1, wherein said two members are relatively rotatable and relatively displaceable.

14. A steering gear according to claim 13, wherein said two members are in axial opposition with the fitting portion of one member facing the other member, said two members being supported for relative axial movement.

15. A steering gear according to claim 14, comprising spring means acting on one of said members for urging said fitting portion towards the other member.

* * * * *